United States Patent [19]

Small

[11] Patent Number: 5,133,560
[45] Date of Patent: Jul. 28, 1992

[54] SPELLING GAME METHOD

[76] Inventor: Maynard E. Small, 105 Ward Parkway, Apt. 507, Kansas City, Mo. 64112

[21] Appl. No.: 576,660

[22] Filed: Aug. 31, 1990

[51] Int. Cl.$^5$ .............................................. A63F 9/22
[52] U.S. Cl. .................................... 273/439; 273/272; 434/167; 434/169
[58] Field of Search .................... 273/237, 272, 439; 434/167, 169; 392/88, 90, 92, 93, 95, 97

[56] References Cited

U.S. PATENT DOCUMENTS

| | | | |
|---|---|---|---|
| 4,189,779 | 2/1980 | Brautingham | 273/237 |
| 4,320,256 | 3/1982 | Freeman | 434/321 |
| 4,372,558 | 2/1983 | Shimamoto et al. | 273/237 |
| 4,539,435 | 9/1985 | Eckmann | 434/307 |
| 4,570,930 | 2/1986 | Matheson | 273/439 |
| 4,592,546 | 6/1986 | Fascenda et al. | 273/439 |
| 4,649,563 | 3/1987 | Riskin | 379/88 |
| 4,749,353 | 6/1988 | Breedlove | 434/169 |
| 4,792,968 | 12/1988 | Katz | 379/92 |
| 4,817,129 | 3/1989 | Riskin | 379/88 |
| 4,827,500 | 5/1989 | Binkerd et al. | 379/88 |
| 4,845,739 | 7/1989 | Katz | 379/92 |
| 4,926,255 | 5/1990 | Von Kohorn | 434/223 |

OTHER PUBLICATIONS

Schrage, Michael, "Von Meister's Not-So-Trivial Pursuit" Washington Post, pp. 1 & 15, Sep. 23, 1985.
Human Factors, 1971, 13(2) pp. 189-190; article by Sidney L. Smith and Nancy C. Goodwin entitled Alphabetic Data Entry Via the Touch-Tone Pad: A Comment.
Scripps Howard; What this Book is: directed to the National Spelling Bee; 1990 Words of the Champions.
Pre-School; No. 231, Spell-It by Cadaco.
Spell It Plus by Davidson & Associates, Inc.

Primary Examiner—Theatrice Brown
Assistant Examiner—Jessica J. Harrison
Attorney, Agent, or Firm—Litman, McMahon & Brown

[57] ABSTRACT

Apparatus and method for playing a spelling game, wherein a player enters a telephone number to obtain access to a specially programmed audiotex voice communication device which enables the user to interact with the device by attempting to spell, under supervision, a sequence of words which are automatically pronounced or defined for the player. Spelling is accomplished, in one form, by sequentially pressing common telephone pad keys, the keys being selected by the alphabetic letter associated therewith.

7 Claims, 1 Drawing Sheet

SPELLING GAME METHOD

INTRODUCTION

The present invention relates generally to the application of programmed computer systems and more particularly to a method and apparatus for playing a game, wherein a player accesses, through a common telephone, an interactive audiotex voice communication device enabling the player to send and receive information in a predetermined sequence and under predetermined controls.

DESCRIPTION OF THE PRIOR ART

It is known to access computer-stored data through a telephonic communications network. In one form, information is obtained by employing a common telephone touch pad, creating alpha or alpha-numeric signal sequences which trigger the transmission of a request for information to a remotely located data base, a synthesized voice signal being used to carry the information requested back to the telephone user. The arrangement allowing this activity is often termed an audiotex voice communication device. The present invention utilizes the basic structure of such audiotex voice communication devices, however, in a novel arrangement which allows the caller to play a game.

SUMMARY OF THE INVENTION

This invention contemplates an apparatus and method for playing a game, and in its preferred form a spelling game, wherein a player enters a telephone number, and, if required, credit information, to obtain access to a specifically programmed audiotex interactive voice communication device. The audiotex device enables the user to interact with the device by attempting to spell, under supervision, a sequence of words which are automatically pronounced or defined for the player. In a preferred form, the results are tallied and reported by the audiotex device at the conclusion of the game.

BRIEF DESCRIPTION OF THE DRAWINGS

While the invention is particularly pointed out and distinctly claimed in the concluding portions herein, a preferred embodiment is set forth in the following detailed description which may best be understood when read in connection with the accompanying drawings in which:

DETAILED DESCRIPTION OF THE PREFERRED EMBODIMENT

Figure 1:
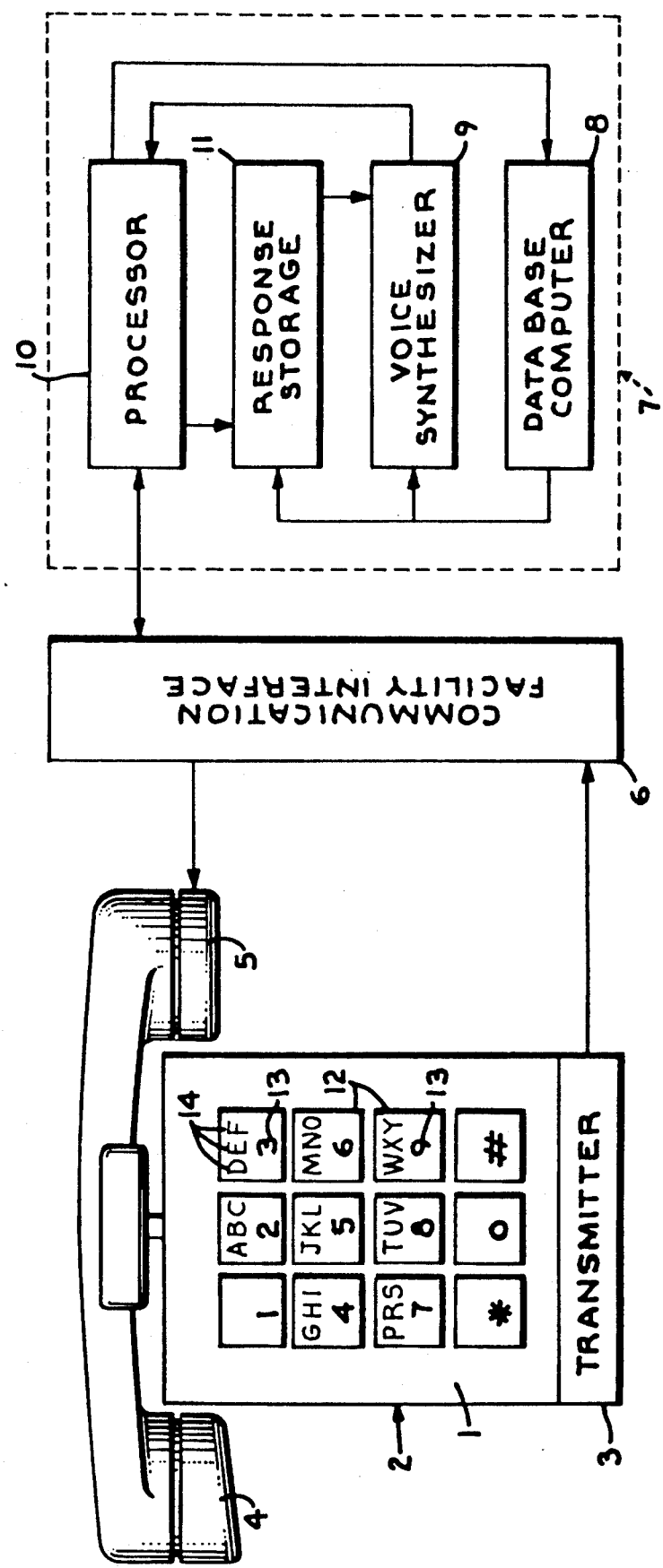
FIG. 1 is a partial block diagram schematically showing a relationship between a common telephone interfaced with an interactive audiotex voice communication device arranged for enabling the user to play a spelling game.

Referring to FIG. 1, the reference numeral 1 designates multiple signal input means in the form of a conventional key pad 1 of a schematically illustrated, common telephone 2. The telephone 2 includes a sound signal transmitter 3 associated with a microphone or mouthpiece 4 and an earpiece or receiver 5 which converts controlled electronic signals to voice language sound for reception by the user.

An appropriate communication facility interface 6, for example, a PBX (private branch exchange) or an ACD (automatic call distributor) or other type of commonly used switching unit, is functionally positioned in the usual manner to relay signals to and from the telephone 2.

The interface 6 is, in turn, functionally connected to a schematically illustrated, normally remote, audiotex device 7. The audiotex device 7 is preferably of the type known as a "large-line, interactive system", designed to support a plurality of simultaneous functions, including answering multiple incoming telephone calls and multiple caller prompting. The prompting function invites caller interaction with predetermined and recorded data by urging the caller to press signal producing keys, forming the active portion of the telephone key pad 1.

More particularly, the audiotex device 7 is adapted to respond to appropriate key produced signals by issuing digitized information which is transformed into audio message signals through a data base computer 8 cooperating with a voice synthesizer 9. Control of the audiotex device 7 is maintained through a processor 10 which communicates with a response storage unit 11. The unit 11 stores signals constituting the responses of the caller to the prompting. The voice synthesizer 9 converts data base stored signals to signals which, at the receiver 5, become easily recognizable audio words to the caller.

The telephone 2, in order to best communicate and function in association with currently available audiotex units, is preferably of the well known dual tone, multifrequency type having twelve keys 12, eight of which are respectively associated with a single number digit 13 and three alphabet letters 14. The remaining keys are sometimes referred to as "special function" keys, but are capable of producing similar signals, although at different, dedicated frequencies.

In practicing the invention, a caller enters a telephone number in the usual manner by sequentially pressing selected keys 12, thereby accessing and triggering the audiotex device 7 to deliver a first predetermined synthesized voice message to the caller. Typically, the first voice message includes an offer to initiate a spelling game with instructions for the player to indicate, by pressing a designated key, a desire to play and receive gaming data, in this example, in the form of the first word of a sequence of words to spell.

If the caller (player) elects to enter the signal in accordance with the instructions, the audiotex device 7 responds by selecting the first word (randomly or in a predetermined order) from a recorded bank of words, and transmit same by synthesized voice to the receiver 5, where it becomes intelligible sound to the player.

Within a measured time limit, the player attempts to spell the word by entering a sequence of dial pad key signals through pressing selected keys of the multiple key pad 1. As noted above, specific dial pad keys are associated with particular letters of the alphabet and the player presses the keys corresponding to what the player believes to be the letters and sequence thereof needed to correctly spell the first word. For example, assuming that the first word is "cat", the player presses the key associated with "c", then presses the same key again, since that key is also associated with the letter "a", and subsequently presses the key associated with the letter "t". The data base computer 8, in this case receiving tone signals generated by the keys numbered 2 and 8, will recognize the sequence of signals 2-2-8 as correctly spelling "cat".

If the spelling sequence is correctly completed within the limited time period, the audiotex unit 7 is triggered to initiate a sequence of events which includes (1) informing the player that the word has been spelled correctly and (2) instructing the player to indicate, by a particular key pad signal, a desire to receive the second voice word. If the player so indicates, the audiotex device then proceeds to select and deliver the second voice word to the player through the telephone receiver 5. The foregoing exchange between the audiotex device 7 and the player is repeated for a predetermined plurality of words, after which the audiotex device informs the player, through words produced by input to the voice synthesizer, of the number of words correctly spelled in the total of words supplied.

Several variations of the game are possible; for example, the player may be informed that a prize has been won for making a predetermined "score"; the words to be spelled, provided by the audiotex device, may be generated in a particular sequence or randomly selected under predetermined criteria from the data base within the data base computer; the audiotex unit may be programmed to limit the number of times or games in which each player may participate during a particular time period to prevent abuse; prizes of various values may be announced for achieving scores, using more or less difficult words and/or the arrangement may be particularly adapted for teaching purposes, rather than utilizing a contest format.

Other variations available include a request by the audiotex device that the player spell a synonym for the word presented, rather than pronouncing the word, or spell a word which constitutes the answer to a verbalized question or description.

Note that for words containing the letter "q" or "z", which are sometimes not found on standard telephone key pads, the signal created by the key identified with the numeral "0" or "1" may conveniently constitute the "Q" and/or "Z" signal recognizable by the audiotex unit.

The game may be played on a rotary dial telephone (not shown) by the player using voice signal to clearly pronounce the numbers of the keys which would otherwise be pressed to identify the respective alphabet letters. Such capability, however, contemplates the use of a voice number recognition unit as part of the processor 10 in the audiotex device 7. In a more sophisticated version, where the audiotex device is programmed to recognize voice signals of letters directly, the letters may be spoken for playing the game. In this version, it may be more convenient to use the voice signals for input to the audiotex device regardless of the type (touch tone pad or rotary pulse) telephone.

The "*", "0" "1" or "#" keys on standard key pads may be used to provide other features, such as a request for the audiotex unit to repeat the pronunciation of a word, adjust volume, request a "live" operator, etc.

It may be desirable that the audiotex unit be programmed to keep track of various individual players by requesting a telephone number, social security number or preassigned number of the player. In the alternative, such identifying number may be requested when identification is necessary because a prize has been won. In any case, the identifying number may be entered in the same manner as entering a usual telephone number, that is, by pressing keys in sequence.

Other variations of the game may be practiced utilizing the basic system described, such as a scrambled letter game, where a group of letters in improper sequence is given to the player, who must put them in the correct sequence, or a word game whereby a word is given to the player who notes the group of letters making up the word and recombines them to produce as many words as possible or vocabulary may be tested by giving the player the definition for a word and the player must identify and spell the word.

In a still further modification, the word to be spelled, or other presentation, is not supplied by the audiotex unit, but by other means, such as newspaper, radio or television. The player, in such cases, accesses the audiotex unit by telephone in the usual manner, receives instructions and provides, by key pad signal, the answer for whatever question is involved.

While particular embodiments of this invention have been shown and/or described, it will be apparent that many changes may be made in the form, arrangement, positioning and use of the various elements. In consideration thereof, it should be understood that preferred embodiments of this invention are intended to be illustrative only and not intended to limit the scope of the invention.

What is claimed and desired to be secured by Letters Patent is as follows:

1. A method for conducting a spelling game wherein a player uses a common telephone having a dual tone, multi-frequency, twelve key dial pad with several of said keys being respectively associated with a single number digit and three different alphabet letters, comprising the steps of:

(a) recording a bank of words to be spelled into a data base, (b) programming an interactive audiotex voice communication device, which includes response storage and a processor, to respond to the entering by the player of predetermined signals produced by the player sequentially pressing selected keys of said dial pad, said response to the entering including the delivery of synthesized voice messages through said telephone to the player, said voice messages requesting player identification signals and providing instructions for the player to play said spelling game and to receive a first word of a plurality of words to spell, (c) programming said audiotex device to select said first word from said data base and transmit said first word by synthesized voice to the player through said telephone, (d) programming said audiotex device to receive and store a sequence of dial pad key signals produced by the player sequentially pressing selected keys of said multiple keys respectively associated with letters of the alphabet in an attempt by the player to correctly spell said first word, (e) programming said audiotex device to recognize said letter signal sequence as corresponding to the correct spelling of said first word although certain of said keys are associated with multiple letters and react from a further keyboard signal to provide the player by synthesized voice with another word to spell, (f) programming said audiotex device to repeat the foregoing selection, transmission, reception and recognition steps for a predetermined plurality of words selected from said data base, (g) programming said audiotex to place a predetermined time constraint on the player for said key signal spelling operation, (h) programming said audiotex device to provide a synthesized voice message to the player through said telephone following the last word of said plurality of words, informing the player of the spelling correctness score of the sequence of words supplied, and (i) further programming said audiotex device to inform the player by voice message if a prize has been won.

2. The method as set forth in claim 1 including the step of:
(a) programming said audiotex device to limit the number of games in which a player may participate during a predetermined time period.

3. The method as set forth in claim 1 including the step of:
(a) programming said audiotex device to repeat a word to be spelled in response to the entry of a predetermined key signal by the player.

4. The method as set forth in claim 1 including the step of:
(a) programming said audiotex device to select said plurality of words in a predetermined sequence.

5. The method as set forth in claim 1 including the step of:
(a) programming said audiotex device to select said plurality of words randomly under predetermined criteria.

6. The method as set forth in claim 1 including the step of:
(a) programming said audiotex device to select said plurality of words by predetermined spelling difficulty criteria.

7. The method as set forth in claim 1 including the step of:
(a) programming said audiotex device to recognize a letter not found on any of said dial pad keys by a signal generated by a key not identified by a letter.

* * * * *